(12) United States Patent
Wallace et al.

(10) Patent No.: US 12,406,992 B2
(45) Date of Patent: Sep. 2, 2025

(54) DISPERSIBLE EDGE FUNCTIONALISED GRAPHENE PLATELETS

(71) Applicant: SICONA BATTERY TECHNOLOGIES PTY LTD, South Perth (AU)

(72) Inventors: Gordon George Wallace, Wollongong (AU); David Leslie Officer, Figtree (AU); Rouhollah Jalili, Maroubra (AU); Ashley John Walker, Albion Park (AU); Gregory Michael Ryder, Unanderra (AU); Shaikh Nayeem Faisal, West Wollongong (AU)

(73) Assignee: SICONA BATTERY TECHNOLOGIES PTY LTD, South Perth (AU)

( * ) Notice: Subject to any disclaimer, the term of this patent is extended or adjusted under 35 U.S.C. 154(b) by 200 days.

(21) Appl. No.: 17/283,705

(22) PCT Filed: Oct. 4, 2019

(86) PCT No.: PCT/AU2019/051076
§ 371 (c)(1),
(2) Date: Apr. 8, 2021

(87) PCT Pub. No.: WO2020/073081
PCT Pub. Date: Apr. 16, 2020

(65) Prior Publication Data
US 2021/0328221 A1 Oct. 21, 2021

(30) Foreign Application Priority Data

Oct. 8, 2018 (AU) .................. 2018903793

(51) Int. Cl.
*H01M 4/587* (2010.01)
*C01B 32/194* (2017.01)
(Continued)

(52) U.S. Cl.
CPC .......... *H01M 4/587* (2013.01); *C01B 32/194* (2017.08); *C08K 3/042* (2017.05); *H01M 4/0404* (2013.01);
(Continued)

(58) Field of Classification Search
CPC .... H01M 4/587; H01M 4/0404; H01M 4/623; H01M 4/133; H01M 4/366; H01M 4/625;
(Continued)

(56) References Cited

U.S. PATENT DOCUMENTS 9,586,825 B2  3/2017  Bozalina et al.
2010/0028681 A1  2/2010  Dai et al.
(Continued)

FOREIGN PATENT DOCUMENTS

CN  102295913 A  12/2011
CN  102803135 A  11/2012
(Continued)

OTHER PUBLICATIONS

Yu et al. "Graphene Nanoplatelets with Selectively functionalized edges as electrode material for electrochemical storage" Langmuir 2015, 31, pp. 5676-5683 (Year: 2015).*

(Continued)

*Primary Examiner* — Andrew J. Oyer
(74) *Attorney, Agent, or Firm* — The Belles Group, P.C.

(57) ABSTRACT

The present disclosure provides a dispersible graphene platelet and a method of making same. The structure of the graphene platelet 10 comprises a base layer 1 of graphene on which at least one discontinuous layer 2, 3, 4 of graphene is stacked, with each layer of graphene above the base layer having a smaller surface area than the layer it is stacked upon. The edges of the base layer and the discontinuous layers stacked upon it are all at least partially functionalised 5, providing a structure with graphene-like properties owing (Continued)

to the base layer and relatively high dispersibility owing to the increased amount of functionalised groups on each platelet. The platelets may be used for a number of applications, for example in the production of electrodes or composite materials.

9 Claims, 7 Drawing Sheets

(51) Int. Cl.
C08K 3/04 (2006.01)
H01M 4/04 (2006.01)
H01M 4/62 (2006.01)

(52) U.S. Cl.
CPC ......... *H01M 4/623* (2013.01); *C01B 2204/04* (2013.01); *C01B 2204/22* (2013.01); *C01B 2204/28* (2013.01); *C01B 2204/30* (2013.01); *C01B 2204/32* (2013.01); *C01P 2002/72* (2013.01); *C01P 2002/82* (2013.01); *C01P 2004/03* (2013.01); *C01P 2004/04* (2013.01); *C08K 2201/001* (2013.01); *C08K 2201/011* (2013.01)

(58) Field of Classification Search
CPC .............. C01B 32/194; C01B 2204/04; C01B 2204/22; C01B 2204/28; C01B 2204/30; C01B 2204/32; C01B 32/19; C01B 32/182; C01B 32/184; C08K 3/042; C08K 2201/001; C08K 2201/011; C08K 2201/014; C01P 2002/72; C01P 2002/82; C01P 2004/03; C01P 2004/04; C01P 2004/24; C01P 2006/40; Y02E 60/10

See application file for complete search history.

(56) References Cited

U.S. PATENT DOCUMENTS

| | | | |
|---|---|---|---|
| 2010/0055458 A1 | 3/2010 | Jang et al. | |
| 2011/0159372 A1 | 6/2011 | Zhamu et al. | |
| 2012/0045688 A1 | 2/2012 | Liu et al. | |
| 2012/0149897 A1* | 6/2012 | Jeon .................. | C07D 471/22 540/477 |
| 2015/0057417 A1* | 2/2015 | Tour ................. | C01B 32/18 526/89 |
| 2017/0217775 A1 | 8/2017 | Sohn et al. | |
| 2021/0328221 A1 | 10/2021 | Wallace et al. | |

FOREIGN PATENT DOCUMENTS

| | | |
|---|---|---|
| CN | 104617300 A | 5/2015 |
| EP | 3863966 A1 | 8/2021 |
| JP | 2012500179 A | 1/2012 |
| JP | 2012527396 A | 11/2012 |
| JP | 2016175828 A | 10/2016 |
| KR | 10-2012-0030446 A | 3/2012 |
| KR | 20150096975 A | 8/2015 |
| WO | WO-2010083378 A2 | 7/2010 |
| WO | WO-2011016889 A2 | 2/2011 |
| WO | WO-2013040356 A1 | 3/2013 |
| WO | 2017130136 A1 | 8/2017 |
| WO | 2020073081 A2 | 4/2020 |

OTHER PUBLICATIONS

Bhattacharjya et al. "Graphene nanoplatelets with selectively functionalized edges as electrode material for electrochemical energy storage" Langmuir, 2015, 31, 5676-5683. (Year: 2015).*

By Bhattacharjya et al. "Graphene nanoplatelets with selectively functionalized edges as electrode material for electrochemical energy storage" Langmuir, 2015, 31, 5676-5683 (Year: 2015).*
International Search Report and Written Opinion of the International Searching Authority, issued in PCT/AU2019/051076, mailed Nov. 25, 2019; ISA/AU.
Japanese Office Action regarding Patent Application No. 2021546020, dated Nov. 1, 2023.
A.V. Rozhkov, A.O. Sboychakov, A.L. Rakhmanov, Franco Nori, Electronic properties of graphene based bilayer systems, Physics Reports, vol. 648, 1-104 (2016), at https://doi.org/10.1016/j.physrep.2016.07.003 (abstract and summary).
Aaron L. Sharpe et al., Emergent ferromagnetism near three-quarters filling in twisted bilayer graphene, Science 365, 605-608 (2019), DOI: 10.1126/science.aaw3780.
Australian Office Action regarding Application No. 2022202850, dated Jun. 30, 2023.
Brazilian Office Action regarding Application No. BR112021006733-7, dated Feb. 1, 2023.
Canadian Office Action regarding Application No. 3,115,550, dated Aug. 21, 2023.
Ding et al., "A water-based green approach to large-scale production of aqueous compatible graphene nanoplatelets" Scientific Reports, Apr. 3, 2018, 8:5567, DOI:10.1038/s41598-018-23859-5.
Eurasian Office Action regarding Application No. 202190745, dated Jul. 28, 2022.
European Office Action regarding Application No. 19870913.1, dated Jul. 11, 2023.
Examination Report No. 1 regarding Australian Application No. 2019356795, dated Nov. 29, 2021.
Examination Report No. 1 regarding Eurasian Application No. 202190745, dated Oct. 6, 2021.
Examination Report No. 2 regarding Australian Application No. 2019356795, dated Feb. 3, 2022.
Examination Report No. 2 regarding Eurasian Application No. 202190745, dated Mar. 4, 2022.
Examination Report No. 3 regarding Australian Applcation No. 2019356795, dated Apr. 7, 2022.
Extended European Search Report regarding Application No. 198709131.1, dated Jun. 23, 2022.
First Chinese Office Action regarding Application No. 201980078897, dated Aug. 3, 2023.
Indian Office Action regarding Application No. 202117019770, dated Sep. 8, 2022.
Invitation to Respond to Written Opinion regarding Singaporean Application No. 11202103501S, dated Apr. 27, 2022.
Invitation to Respond to Written Opinion regarding Singaporean Application No. 11202103501S, dated Aug. 16, 2023.*
Jisoo Park et al, "Highly dispersible edge-selectively oxidized graphene with improved electrical performance", Nanoscale, United Kingdom, (Jan. 1, 2017), vol. 9, No. 4, doi:10.1039/C6NR05902C, ISSN 2040-3364, pp. 1699-1708, XP055761540.
Korean Office Action regarding Application No. 10-2021-7013347, dated Dec. 18, 2023.
Kyung-Su Kim et al, "Edge-functionalized graphene-like platelets as a co-curing agent and a nanoscale additive to epoxy resin", Journal of Materials Chemistry, Royal Society of Chemistry, GB, (Jan. 1, 2011), vol. 21, No. 20, ISSN 0959-9428, pp. 7337-7342, XP002765143.
Second Chinese Office Action regarding Application No. 201980078897, dated Dec. 21, 2023.
Y. Cao, J.M. Park, K. Watanabe et al., Pauli-limit violation and re-entrant superconductivity in moire graphene, Nature 595, 526-531 (2021), at https://doi.org/10.1038/s41586-021-03685-y (abstract).

* cited by examiner

DISPERSIBLE EDGE FUNCTIONALISED GRAPHENE PLATELETS

CROSS-REFERENCE TO RELATED APPLICATIONS

This application is a 371 U.S. National Stage of International Application No. PCT/AU2019/051076, filed on Oct. 4, 2019, which claims priority to Australian Application No. 2018903793 filed on Oct. 8, 2018. The entire disclosures of the above applications are incorporated herein by reference.

TECHNICAL FIELD

The present disclosure relates to a novel edge functionalised graphene platelet structure and a method of producing same.

BACKGROUND OF THE DISCLOSURE

Graphene, a carbon film one atomic layer thick, has a number of desirable properties such as high thermal and electrical conductivity as well as high mechanical strength. Accordingly, graphene is a promising material for a wide range of applications such as energy storage, biological sensing, and filtration, as well as improved electrical and medical devices. Currently though, use of graphene in these applications is limited by the difficulty in producing and storing large quantities of graphene or graphene derivatives such as nanoplatelets or nanoribbons for industrial scale manufacture while maintaining the desired properties of graphene. The term graphene is commonly accepted to refer to carbon films (and associated materials) between one and ten atomic layers thick. It will thus be understood that throughout this specification, that graphene refers to carbon films of up to ten atomic layers. Carbon films with more than ten atomic layers are typically referred to as graphite.

Since graphene was first isolated by mechanical cleavage through the 'scotch tape' method where adhesive tape was used to strip layers of graphene off bulk graphite, numerous processing routes such as chemical vapour deposition and ball milling have been investigated with the aim of providing an efficient method to produce industrial scale quantities of graphene, but currently, few have proved viable.

The Hummers' method, developed in the 1950s to produce graphite oxide, has been modified to enable the production of large quantities of graphene oxide. Attempts have been made to convert graphene oxide to graphene by reduction. Currently however, graphene oxide has not been successfully reduced to graphene, such that while large quantities can be produced, they have sub-optimal properties compared to native graphene.

One production route that has shown promise is liquid-phase exfoliation. In this method, graphite is exfoliated into graphene in a liquid media, often by use of an ultrasonication. As the layers of graphene are held together by weak van der Waals forces, ultrasonic waves are able to break apart layers of graphene. This can further be improved by altering the composition of the liquid media to include solvents or stabilizers to decrease the potential energy barrier between the sheets.

An issue with graphene produced by liquid-phase exfoliation is large amounts of solvents are required, owing to the poor dispersibility of graphene structures. For instance, pure graphene can only be dispersed in pure water at concentrations below 0.01 g/L and this limit is not greatly improved by the addition of surfactants or by constant agitation. Above these concentrations, graphene tends to agglomerate, restacking into graphite structures. Accordingly, it is unfeasible to store graphene for long periods of time as large amounts of solvents are required. Thus, a form of graphene allowing for a higher stable dispersion in water while retaining the beneficial properties of graphene such as electrical conductivity is desired.

The tendency of graphene structures to agglomerate also poses a challenge in using graphene structures in composite materials. In many cases, it is preferable to have a homogenous distribution of a dispersed phase, such as graphene, within the matrix of another material, for instance a polymer, to improve the matrix material's properties such as strength and electrical conductivity. A stable dispersion of graphene structures would enable easier fabrication of graphene composites with higher concentrations of the dispersed phase, allowing greater tailoring of the composite's material properties.

A means of increasing the dispersity of graphene structures is by functionalising the edges of the graphene sheets. This allows the structure to substantially retain the properties of native graphene while increasing the dispersity. These structures are often referred to as edge-functionalised graphene.

A method for producing edge functionalised graphene was described by Ding et al. Sci. Rep. 8:5567 (2018). This method comprises adding graphite powder to degassed water, sonicating the mixture to produce a black graphite slurry, vapour exfoliating the slurry by mechanical stirring at heat to functionalise the edges of the platelets, and cooling, diluting and sonicating the resultant mixture to purify it. This produced nanoplatelets a few layers thick with hydroxyl groups at the edges. These edge groups allow the platelets to be dispersed in water at concentrations up to 0.55 g/L. While this represents an improvement in the dispersibility of graphene structures, large amounts of solvent are still required. Accordingly, a graphene structure with greater dispersibility is still sought after for use in industrial scale manufacture.

The present invention seeks to provide an edge-functionalised graphene platelet structure which substantially retains the beneficial properties of pure graphene but is also capable of being stored in higher concentrations than existing graphene structures.

SUMMARY OF THE INVENTION

In one aspect, the present invention provides a dispersible graphene platelet including: a base layer of graphene; at least one discontinuous graphene layer stacked on the base layer; wherein the at least one discontinuous layer has a smaller surface area than the base layer; and, wherein the edge regions of the base layer and the at least one discontinuous layer are at least partially functionalised.

In certain embodiments of the first aspect, the platelet is able to form a stable dispersion in water at concentrations up to 700 mg/mL.

In certain embodiments of the first aspect, the electrical conductivity of the platelet is approximately 900 S/cm.

In certain embodiments of the first aspect, the platelet is further functionalised by the addition of metal ions to at least one of the functionalised edges or the surface.

In certain embodiments of the first aspect, the metal ions are selected from Fe, Cu, Co, and Sn.

According to a second aspect, there is provided a polymer-matrix composite material comprising a polymer; and graphene platelets according to the first aspect.

In certain embodiments of the second aspect, the polymer is selected from alginate, chitosan, PVA, PEG, PU, PEI, PVDF, PDMS or PEDOT PSS.

According to a third aspect, there is provided an electrode for electrochemical processes comprising; graphene platelets according the first aspect; and a binder.

In certain embodiments of the third aspect, the binder is selected from Nafion and PVDF.

According to a fourth aspect, there is provided a method for producing an electrode according to the third aspect, comprising: creating a mixture containing graphene platelets according to the first aspect and a binder; and coating the mixture onto an electrode substrate.

According to a fifth aspect, there is provided a method for producing dispersible graphene platelets including the steps of:
 a. suspending graphite or graphene in a solution containing an organic nitrile (such as acetonitrile), an ester (such as ethyl acetate) and water; and
 b. reacting the solution containing suspended graphite or graphene with an oxidant (such as ruthenium tetroxide) to at least partially functionalise edge regions of the graphite or graphene.

In certain embodiments of the fifth aspect, the method further comprises the step of: cooling the resultant solution obtained in step b. in an ice bath.

In certain embodiments of the fifth aspect, the method further comprises the step of: homogenising the resultant solution obtained in step b.

In certain embodiments of the fifth aspect, the homogenisation is conducted at 20000 rpm up to 2 hours.

In certain embodiments of the fifth aspect, the method further comprises the step of: ultrasonicating the resultant solution obtained in step b.

In certain embodiments of the fifth aspect, the method further comprises the step of: filtering the resultant solution obtained in step b to produce a filtered solid.

In certain embodiments of the fifth aspect, the method further comprises the step of: washing the filtered solid.

In certain embodiments of the fifth aspect, washing includes washing the filtered solid with HCl and water.

In certain embodiments of the fifth aspect, the filtered solid is washed with HCl until a filtrate produced by washing the filtered solid is colourless and then with water until the filtrate is neutral.

In certain embodiments of the fifth aspect, the filtered solid is washed with an organic solvent such as ethanol or acetone.

In certain embodiments of the fifth aspect, the filtered solid is dried in vacuo to produce a dried powder.

In certain embodiments of the fifth aspect, the filtered solid is freeze dried to produce a dried powder.

In certain embodiments of the fifth aspect, the dried powder is dispersed in water and sonicated for up to 30 minutes, and a resulting mixture is allowed to settle for up to 48 hours to produce a solid and a supernatant, and decanting and filtering the supernatant to produce a graphene powder.

In certain embodiments of the fifth aspect, the graphene powder is washed with an organic solvent and dried.

In certain embodiments of the fifth aspect, the dried powder is dispersed in water and sonicated for up to 30 minutes, and a resulting mixture is centrifuged to produce a solid and a supernatant.

In certain embodiments of the fifth aspect, the oxidant is ruthenium tetroxide.

In certain embodiments of the fifth aspect, the ruthenium tetroxide is provided via the reaction of sodium periodate with ruthenium chloride added to the solution containing suspended graphene or graphite.

In certain embodiments of the fifth aspect, the graphene or graphite is provided in the form of expanded graphite with an increased interlayer spacing.

In certain embodiments of the fifth aspect, the filtered solid is then dispersed in a solution containing metal ions to bind metal ions to at least one of a surface or a functionalised edge of the platelet.

In certain embodiments of the fifth aspect, the metal ions are selected from Fe, Cu, Co, and Sn.

According to a sixth aspect, there is provided a dispersible graphene platelet according to the first aspect, produced by a method according to the fifth aspect.

According to a seventh aspect, there is provided a method for producing dispersible graphene platelets including the steps of: suspending graphite or graphene in a solution; and, contacting the solution containing suspended graphite or graphene with an oxidant to at least partially functionalise edge regions of the graphite or graphene.

DETAILED DESCRIPTION

Figure 1:
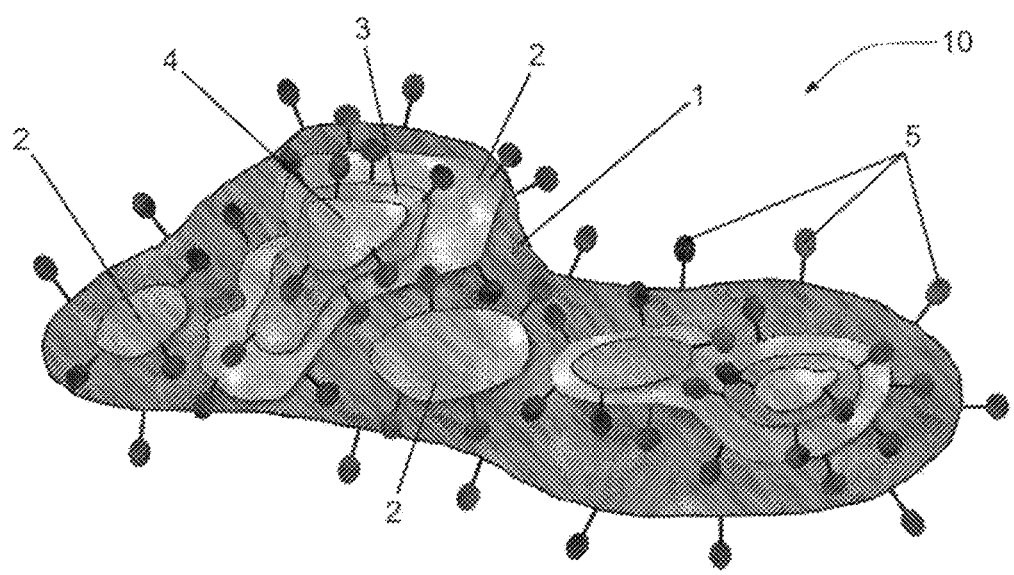
FIG. 1 shows a schematic representation of a dispersible graphene platelet.
Figure 2:
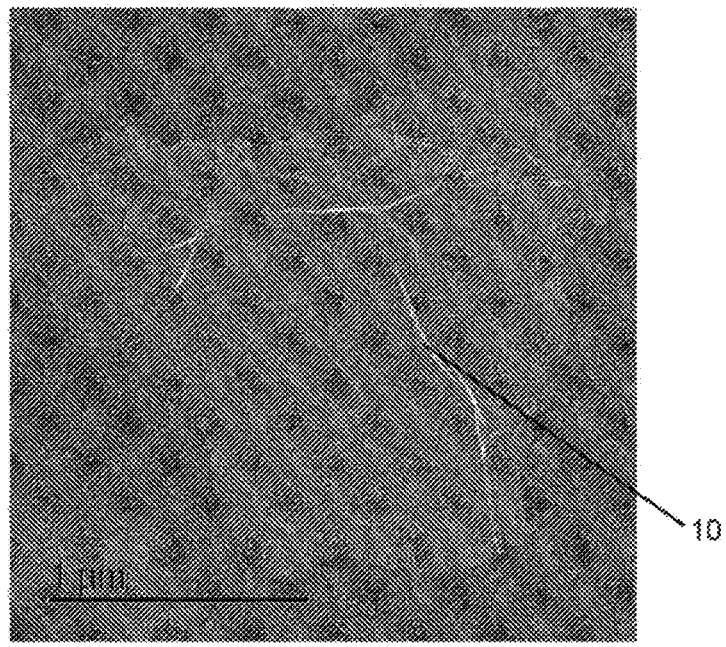
FIG. 2 shows a low magnification bright field TEM image of a single dispersible graphene platelet.
Figure 3:
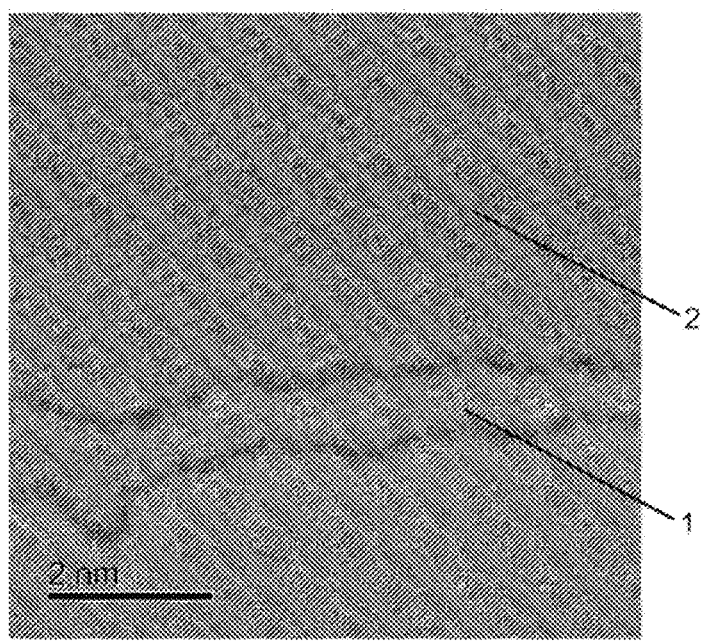
FIG. 3 shows a high magnification bright field TEM image of the edge of a dispersible graphene platelet.
Figure 4:
FIG. 4 shows an SEM image of a dispersible graphene platelet at 5000× magnification.

The dispersible graphene platelet has a structure containing a base layer of graphene at a micron scale. On the surface of this base layer are irregular nanometer sized graphene layers which may be stacked as high as seven to nine layers above the base layer. Otherwise stated, the structure comprises a base layer of graphene on which at least one discontinuous layer of graphene is stacked, with each layer of graphene above the base layer having a smaller surface area than the layer it is stacked upon. The edges of the base layer and the discontinuous layers stacked upon it are all at least partially functionalised, providing a structure with graphene-like properties owing to the base layer and improved dispersibility owing to the increased amount of functionalised groups on each platelet.

FIGS. 1 and 2-4 show a schematic view and microscopy images respectively of a dispersible graphene platelet 10. The base graphene layer 1 is sized at a micron level, and features functionalised groups 5 such as hydroxyl or carboxyl acids around its edges. Platelet 10 further includes a discontinuous graphene layer 2 stacked on the surface of base layer 1. Further discontinuous graphene layers 3 and 4 are stacked on top of layer 2, the surface area of each discontinuous layer may be smaller relative to the layer below it. The edges of each discontinuous layer also feature a degree of functionalisation in the form of functionalised groups 5.

In a preferred embodiment, $RuO_4$ may be used as the oxidant for functionalising the edges of the graphene platelets. $RuO_4$ is suitable owing to its strong but selective oxidation effects, allowing the partial conversion of the outermost rings of the graphene structure to carboxylic acids or phenols while leaving the inner structure unmodified. $RuO_4$ can be provided to the graphene or graphite via the reaction of $RuCl_3$ and $NaIO_4$ in solution.

In another preferred embodiment, the graphite used to produce the dispersible graphene platelets may be first thermally expanded to increase the interlayer spacing prior to being placed in solution. This may, in one non-limiting example, be carried out at temperatures between 700-1000° C. Graphite treated in this way is commonly referred to as expanded graphite.

The produced graphene platelet dispersion may be used to produce electrically conducting materials. For instance, it may be desirable to use these platelets to fabricate electrodes for electrochemical processes using a mixture of a dispersion of platelets with a binder such as Nafion or PVDF and coating the resultant mixture onto an electrode surface. An electrode produced in this manner could then be used in a battery or in electrochemical processes such as $CO_2$ reduction.

In some embodiments, the produced graphene platelets can be further functionalised by binding of metal ions to either the functionalised edges or the surface of the platelet. In some preferred embodiments, the metal ions are selected from iron, copper, cobalt and tin.

The present disclosure will become better understood from the following example of a non-limiting embodiment of a method for producing the aforementioned graphene platelets.

In a first experiment, 100 mg of graphene with 99.9999% purity was suspended in a solution containing 2 mL of MeCN, 2 mL of EtOAc, and 2 mL of water. 222 mg (0.125 eq) of $NaIO_4$ and 4 mg (0.002 eq) of $RuCl_3 \cdot xH_2O$. The resulting mixture was cooled using an ice bath and homogenized at 20000 rpm for 1 hour. Following this, the mixture was ultrasonicated for 2 hours, filtered, and washed with water and 1 M HCl until the filtrate was colourless. The filtrate was then washed with water until the filtrate was neutral. The filtrate was then freeze dried to produce a black powder containing edge functionalised graphene platelets.

In a second experiment, graphite (20 g, 1.67 mol) was suspended in MeCN (400 mL), EtOAc (400 mL) and water (600 mL). $NaIO_4$ (71.2 g, 333 mmol) and $RuCl_3 \cdot xH_2O$ (820 mg, 3.4 mmol, ~0.2 mol %) were added and the resulting mixture was cooled in an ice bath and homogenized (~20000 rpm) for 1 hour. The homogenizer was then removed and the mixture was ultrasonicated for 2 hours. The suspension was filtered, then the filtered solid was washed with water (100 mL) to remove excess, 1 M HCl until the filtrate was colourless, then again with water until the filtrate was neutral. The resulting solid could be suspended in water and freeze dried or washed with ethanol and dried in vacuo to yield the product as a black powder.

It will be understood that while the ruthenium tetroxide was formed in these experiments by sodium periodate and ruthenium chloride, other oxidants such as sodium hypochlorite may be used instead.

It has also been found that a longer lasting dispersion can be achieved by removing non-dispersable particles. This may be carried out by an additional process on the dried powder, comprising sonicating a dispersion of the dried powder in water for up to 30 minutes and allowing the resulting dispersion to either settle for up to 48 hours or centrifuging the dispersion. The dispersion supernatant can then be decanted to remove the settled particles, and then the supernatant filtered to obtain the graphene powder. This powder can then be washed with an organic solvent such as ethanol or acetone and dried in vacuo or freeze dried.

A number of experiments were carried out to characterize the platelets and verify the presence of functional groups at the edges of each layer. These are described below.

Figure 5A:
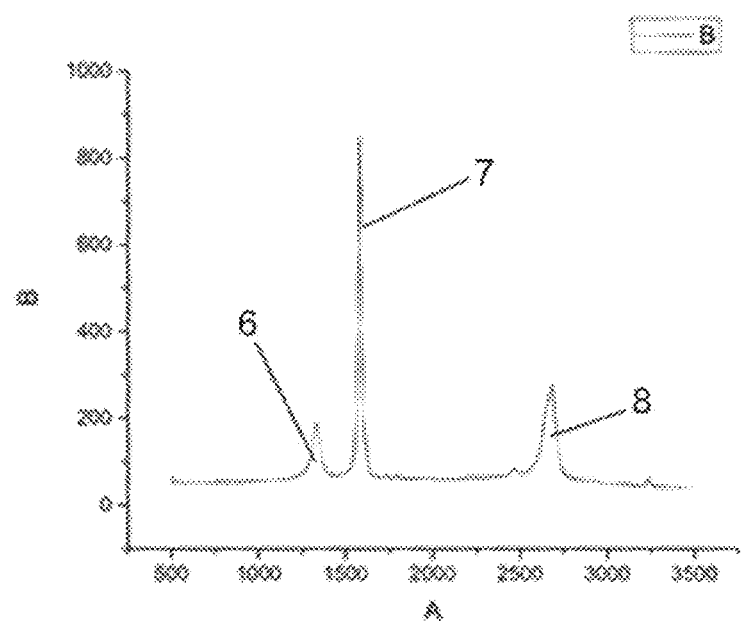
FIG. 5A shows a Raman spectrum for a sample of graphene platelets.
Figure 5B:
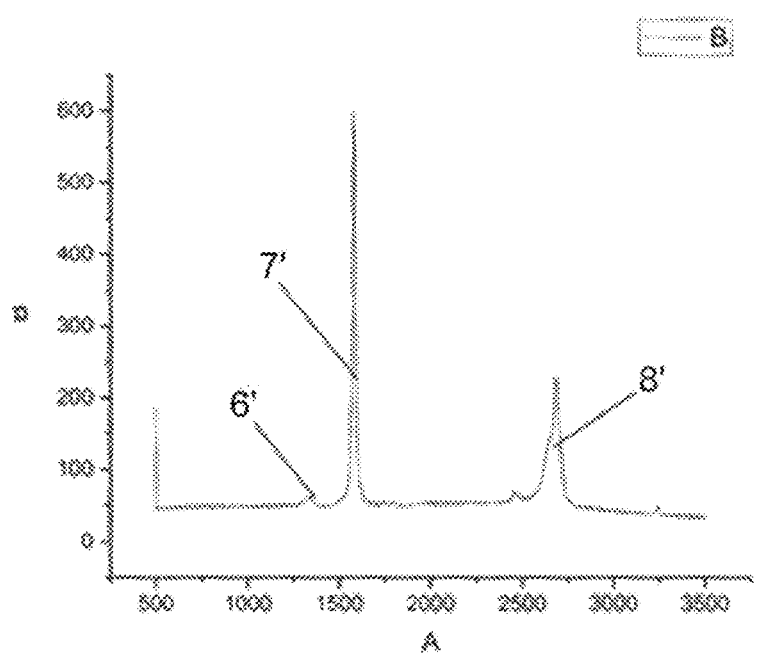
FIG. 5B shows a Raman spectrum for 99.9999% graphite.
Figure 6A:
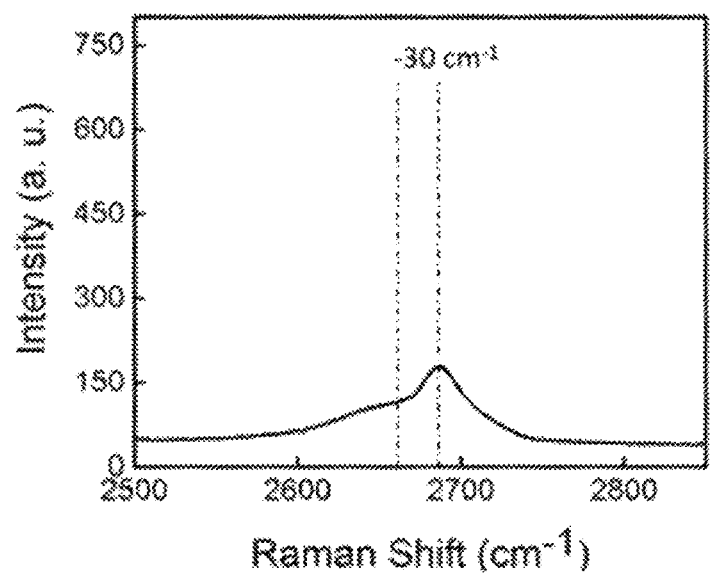
FIG. 6A shows an expanded 2D band from the Raman spectrum of the edges of a dispersible graphene platelet.
Figure 6B:
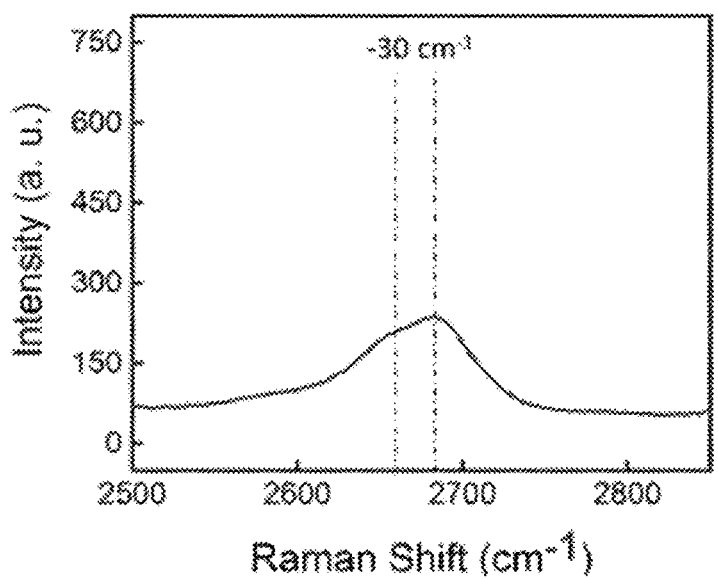
FIG. 6B shows an expanded 2D band from the Raman spectrum of the basal plane of a dispersible graphene platelet.

Raman spectroscopy was used to compare the chemical structure of the produced graphene platelets to that of bulk graphite. Referring to FIGS. 5A and 5B, the Raman spectra of produced graphene platelets and 99.9999% pure graphite are shown respectively. Both spectra show a D band 6, 6', a G band 7, 7', and a 2D band 8, 8'. Graphene structures produced by reduced graphene oxide which typically show D bands larger than the G band which is not the case for the produced platelets. This suggests that the platelets are substantially graphene. Referring to FIGS. 6A and 6B, analysis of the 2D Raman bands of the edge and basal planes respectively of the graphene plates allowed the determination of a thickness metric M, which can be used to determine the number of monolayers per graphene flake $N_G$ according to the equation $N_G=10^{0.84M+0.45M^2}$. This confirmed that there were 2 layers at the graphene platelet edges and up to 6 layers on the basal plane.

Figure 7A:
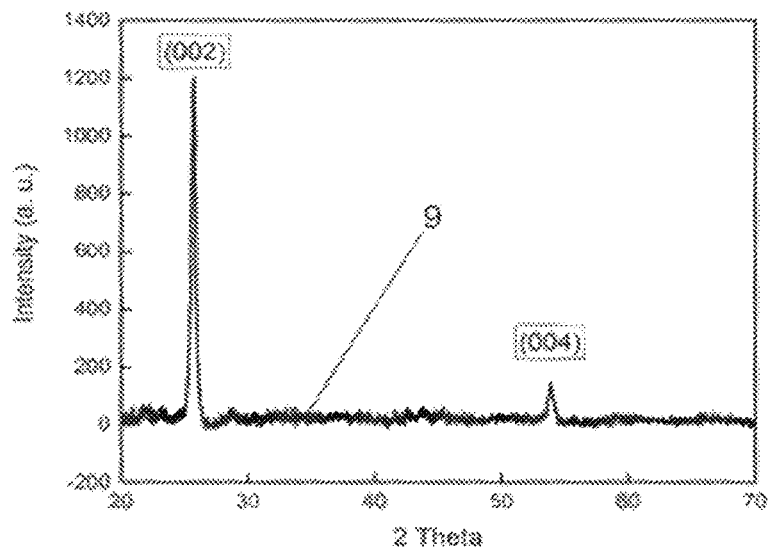
FIG. 7A shows the XRD spectrum for a sample of graphene platelets.
Figure 7B:
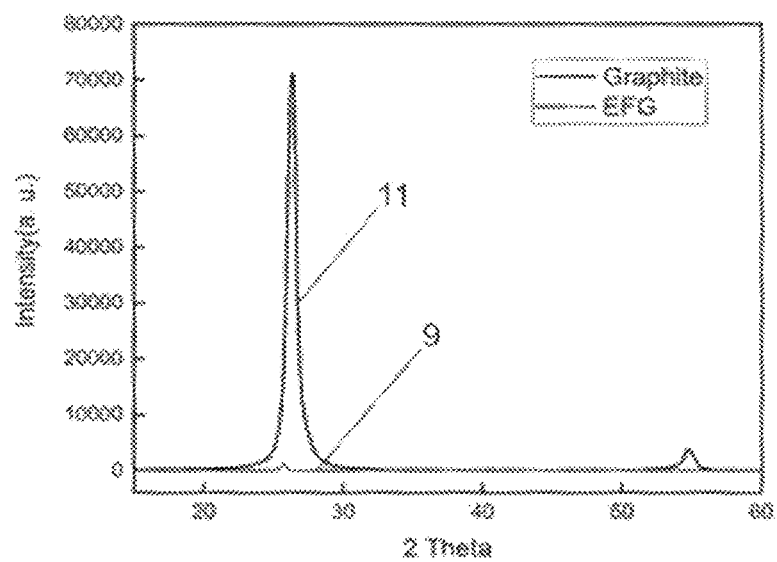
FIG. 7B shows the XRD spectrum for both 99.9999% graphite and graphene platelets.

Referring to FIGS. 7A and 7B, this is further backed up by the results of x-ray diffraction, where the graphene platelet spectrum 9 is substantially in line with the spectrum of graphite 11. The diminished intensity is expected as XRD provides a measure of crystallinity and graphite, consisting of numerous graphene layers necessarily has a far greater degree of crystallinity than graphene platelets which only have a few layers. The slight shift in the platelet spectrum 9 compared to graphite 11 is attributed to the functional groups at the edges increasing the interlayer distance.

Figure 8:
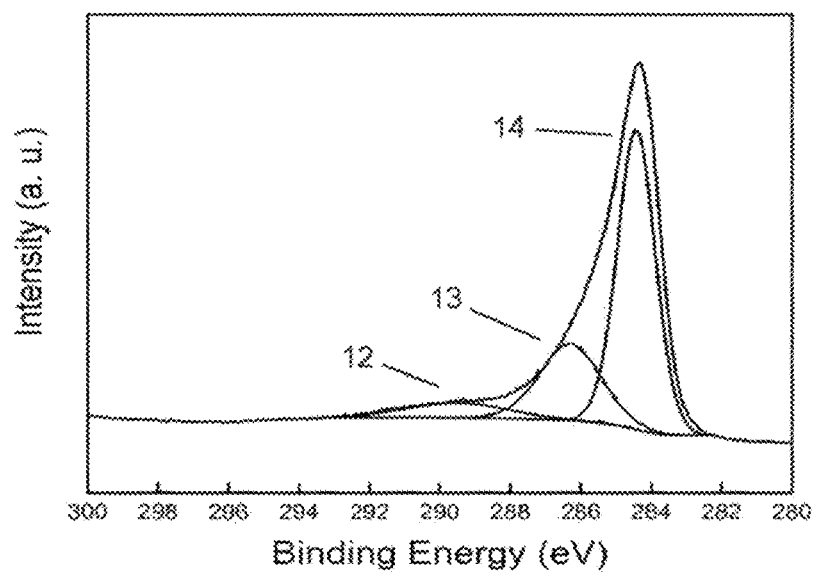
FIG. 8 shows an XPS spectrum for a sample of graphene platelets.
Figure 9:
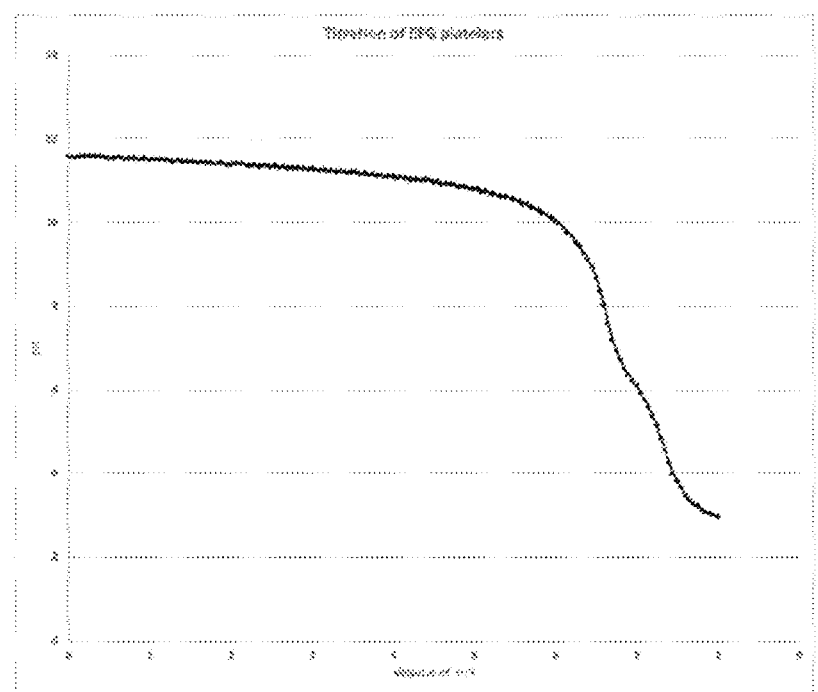
FIG. 9 shows a graph of the titration of a dispersion of the graphene platelets.

The presence of the functional groups was investigated using X-ray photoelectron spectroscopy. This showed a composition of 94% C and around 6% O similar again to graphite. The XPS spectra as shown in FIG. 8 shows the presence of 3 different types of C atoms, aromatic C at 284.5 eV (14 in FIG. 8), phenolic C at 286.3 eV (13 in FIG. 8) and carboxyl C at 289.8 eV (12 in FIG. 8), suggesting the presence of carboxylic acid and phenol groups. Thermogravimetric analysis was conducted to calculate a carboxylic acid content of 0.15 mEq/g. High angle annular dark field (HAADF) scanning transmission electron microscopy showed bright edges attributed to the presence of oxygen atoms at these locations, suggesting successful edge functionalisation of the graphene platelets. The presence of both carboxyl and phenolic groups was further supported by titration of a dispersion of the edge functionalized graphene platelets in 0.1 M NaOH by 0.1 M HCl, as shown in FIG. 9 which shows two pKa values at pH=4.2 and 8.0, attributable to the carboxyl and phenolic groups, respectively.

With the structure of the platelets established, experiments were carried out to measure the dispersibility and conductivity of the platelets, as well as their ability to be fabricated into polymer composites.

The edge functionalised graphene platelets were found to allow suspensions in water at concentrations of up to 700 mg/mL in contrast to the 0.55 mg/L previously achieved by previous methods. Suspensions of up to 10 mg/L edge functionalised graphene in water were found to be stable for at least 3 months. At suspensions over 10 mg/mL, settling of the platelets was observed in solution, however redispersion could be achieved with brief shaking of the solution. Suspensions of 100 mg/mL have been found to be stable in water for at least 6 hours. Suspensions of 50 mg/mL have been found to be stable in organic solvents such as toluene, ethanol, NMP and DMF for at least 6 hours. Improved dispersion was also found in other solvents including IPA, MeOH, $CH_2Cl_2$, DMF, and THF, and suggests that the platelets may also have high dispersion in other solvents not explicitly mentioned.

For suspensions with a relatively high proportions of graphene platelets to solvent, the nature of the resultant solution may change. Suspensions of the edge functionalised graphene platelets with more than 25 wgt % edge functionalised graphene in water have been found to form a paste, while suspensions with more than 35 wgt % edge functionalised graphene in water have been found to form a moldable dough. The ability of the resultant dough to be molded allows the forming of almost any shape from the material. Pastes have been observed in 250 mg/mL in water, organic solvents, and ionic liquids. Doughs have been observed in 350-700 mg/mL in water, organic solvents, and ionic liquids.

The edge functionalised graphene platelets were formed into free-standing papers using vacuum filtration and the conductivity measured by 4 point probe conductivity measurements. The free-standing paper was found to have a highly desirable electrical conductivity of 900 S/cm.

Alternatively, the produced platelet dispersions can be used to fabricate composite materials, for example using a polymer such as alginate, chitosan, PVA, PEG, PU, PEI, PVDF or PEDOT PSS. In a first test experiment, 50 mg of platelets and 100 mg of polyvinyl alcohol (PVA) were stirred in 150 mL of water at 60° C. for between 6 and 8 hours until it was concentrated to 10-15 mL. Drop casting was then used to produce free-standing films of a PVA-graphene platelet composite. In another composite fabrication proof of concept test, a dispersion of 70% graphene platelets and 30% chitosan in water were 3D extrusion printed to form a scaffold.

The produced platelet dispersions were also used to fabricate metal functionalised graphene platelets. A proof of concept test was carried out comprising mixing a 0.1 mg/mL solution of iron chloride ($FeCl_3$) with a 1 mg/mL graphene platelet dispersion. The mixture was then stirred for 30 minutes at room temperature before being centrifuged, washed with water to remove excess iron chloride, then freeze dried. This successfully resulted in Fe-functionalised graphene platelets as measured by XPS and SEM imagery, with XPS showing substitutional iron doping at the surface at 0.4 at. %. Fe-functionalised graphene platelets showed magnetic behavior.

Further functionalisation was achieved by annealing the Fe-functionalised platelets at 750° C. under $N_2$ gas for 1 hour, resulting in a dispersion of iron/iron oxide nanoparticles across the platelet surface. Similar tests, using copper chloride and tin chloride in place of iron chloride resulted in copper/copper oxide and tin/tin oxide nanoparticles being bound to the platelets respectively.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

The invention claimed is:

1. A dispersible graphene platelet including:
    a base layer of graphene;
    at least one discontinuous graphene layer stacked on the base layer;
    wherein each discontinuous layer has a smaller surface area than the layer it is stacked upon;
    wherein each base layer and each discontinuous layer is defined by a central region and an edge region; and
    wherein the edge regions of the base layer and the at least one discontinuous layer are at least partially functionalized by oxidation with ruthenium tetroxide and the central regions of the base layers and the discontinuous layers are unfunctionalized;
    wherein the resulting platelet forms a stable dispersion in water at concentrations up to 10 mg/mL for at least 3 months, forms a stable suspension in water at concentrations over 100 mg/mL for at least 6 hours, or forms a stable suspension in organic solvents at concentrations of 50 mg/mL for at least 6 hours.

2. The platelet according to claim 1, wherein the electrical conductivity of the platelet is approximately 900 S/cm.

3. The platelet according to claim 1, wherein the platelet is further functionalised by the addition of metal ions to the functionalised edges, and wherein the metal ions are selected from Fe, Cu, Co, and Sn.

4. The platelet according to claim 1, wherein the ruthenium tetroxide is provided via a reaction of sodium periodate with ruthenium chloride in-situ with suspended graphene.

5. A polymer-matrix composite material comprising
    a polymer; and
    graphene platelets according to claim 1.

6. The polymer-matrix composite material according to claim 5 wherein the polymer is selected from alginate, chitosan, PVA, PEG, PU, PEI, PVDF, PDMS or PEDOT PSS.

7. An electrode for electrochemical processes comprising;
   graphene platelets according to claim 1; and
   a binder.

8. An electrode according to claim 7 wherein the binder is selected from Nafion and PVDF.

9. A method for producing an electrode according to claim 8, comprising:
   creating a mixture containing graphene platelets according to claim 1 and a binder; and
   coating the mixture onto an electrode substrate.

* * * * *